US011039477B2

(12) United States Patent  
Charbit et al.

(10) Patent No.: US 11,039,477 B2  
(45) Date of Patent: Jun. 15, 2021

(54) NB-IOT PRACH RESOURCE PARTITIONING AND MULTIPLE GRANTS IN RAR FOR EDT

(71) Applicant: MediaTek Inc., Hsinchu (TW)

(72) Inventors: Gilles Charbit, Hampshire (GB); Shiang-Jiun Lin, Hsinchu (TW); Li-Chuan Tseng, Hsinchu (TW); Per Johan Mikael Johansson, Kungsangen (SE)

(73) Assignee: MediaTek Inc.

( * ) Notice: Subject to any disclaimer, the term of this patent is extended or adjusted under 35 U.S.C. 154(b) by 30 days.

(21) Appl. No.: 16/192,754

(22) Filed: Nov. 15, 2018

(65) Prior Publication Data

US 2019/0159260 A1  May 23, 2019

Related U.S. Application Data

(60) Provisional application No. 62/587,671, filed on Nov. 17, 2017.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 1/0003* (2013.01); *H04L 1/0061* (2013.01);
(Continued)

(58) Field of Classification Search
CPC . H04W 74/0833; H04W 72/14; H04W 88/06; H04W 72/042; H04W 72/0413;
(Continued)

(56) References Cited

U.S. PATENT DOCUMENTS 10,575,205 B2 * 2/2020 Chen ............... H04W 4/70  
10,721,775 B2 * 7/2020 Park ............... H04W 52/0216  
(Continued)

FOREIGN PATENT DOCUMENTS

WO  WO 2014056426 A1  4/2014

OTHER PUBLICATIONS

State Intellectual Property Office of China, International Search Report and Written Opinion for International Patent Application No. PCT/CN2018/116162, dated Feb. 19, 2019.
(Continued)

*Primary Examiner* — Hanh N Nguyen  
(74) *Attorney, Agent, or Firm* — Andy M. Han; Han IP PLLC (57) ABSTRACT

Various examples and schemes pertaining to NB-IoT physical random access channel (PRACH) resource partitioning and multiple grants in random access response (RAR) for early data transmission (EDT are described. A network node schedules multiple grants for EDT during a random access (RA) procedure with a user equipment (UE). The network node transmits to the UE a message indicating the multiple grants mapped to a maximum broadcast transport block size (TBS) configured for each of one or more preamble resource of a plurality of preamble resources. The UE calculates a TBS that fits an uplink (UL) data packet of the UE. The UE selects one or more PRACH resources for EDT for the TBS based on a wireless communication coverage of the UE by the network node. The UE transmits to the network node in the RA procedure a first message (Msg1) indicating the selected one or more PRACH resources.

18 Claims, 8 Drawing Sheets

(51) Int. Cl.
| | |
|---|---|
| *H04L 1/00* | (2006.01) |
| *H04W 72/04* | (2009.01) |
| *H04W 72/14* | (2009.01) |
| *H04W 88/06* | (2009.01) |
| *H04W 72/00* | (2009.01) |
| *H04L 1/08* | (2006.01) |

(52) U.S. Cl.
CPC .......... *H04L 5/0044* (2013.01); *H04L 5/0053* (2013.01); *H04L 5/0094* (2013.01); *H04W 72/042* (2013.01); *H04W 72/14* (2013.01); *H04W 88/06* (2013.01); *H04L 1/08* (2013.01); *H04W 72/00* (2013.01)

(58) Field of Classification Search
CPC ............. H04W 74/0866; H04W 72/02; H04W 72/1268; H04W 68/02; H04W 76/27; H04W 72/00; H04L 5/0044; H04L 5/0053; H04L 5/0094; H04L 1/08; H04L 1/0032; H04L 1/0025; H04L 1/0075
See application file for complete search history.

(56) References Cited

U.S. PATENT DOCUMENTS

| | | | |
|---|---|---|---|
| 2014/0307667 A1 | 10/2014 | Wager et al. | |
| 2016/0262182 A1 | 9/2016 | Yang et al. | |
| 2017/0135066 A1 | 5/2017 | Vos et al. | |
| 2018/0324869 A1* | 11/2018 | Phuyal | H04W 72/14 |
| 2019/0037447 A1* | 1/2019 | Lee | H04W 74/004 |
| 2019/0141753 A1* | 5/2019 | Lin | H04W 76/27 |
| 2019/0159197 A1* | 5/2019 | Shrestha | H04L 1/1887 |
| 2019/0159257 A1* | 5/2019 | Rico Alvarino | H04W 72/04 |
| 2019/0215872 A1* | 7/2019 | Park | H04W 74/0833 |
| 2019/0223221 A1* | 7/2019 | Johansson | H04W 88/023 |
| 2019/0246378 A1* | 8/2019 | Islam | H04L 1/1896 |
| 2019/0364605 A1* | 11/2019 | Loehr | H04W 74/0833 |

OTHER PUBLICATIONS

Mediatek Inc., NPRACH resource partition for early data transmission, 3GPP TSG-RAN WG2 Meeting #99bis, Oct. 9-13, 2017, Prague, Czech Republic.
Ericsson, Report from Rel-15 MTC session, 3GPP TSG-RAN WG2 Meeting #99bis, Oct. 9-13, 2017, Prague, Czech Republic.
Taiwan Intellectual Property Office, Office Action for Taiwan Patent Application No. 107141071, dated Nov. 29, 2019.

\* cited by examiner

CONFIGURATION OF NPRACH RESOURCE FOR CE 0, CE 1, CE 2

- EDT CE 0, nprach-NumSubcarriers-EDT-r15 12 sub-carriers, 4 rep, nprach-Periodicity-EDT-r15 40ms
- EDT CE 1, nprach-NumSubcarriers-EDT-r15 36 sub-carriers, 16 rep, nprach-Periodicity-EDT-r15 640ms
- EDT CE 2, nprach-NumSubcarriers-EDT-r15 36 sub-carriers, 32 rep, nprach-Periodicity-EDT-r15 640ms

CONFIGURATION OF $TBS_{MSG1}$ SIZES

- nprach-TBSMsg1-TBS1-EDT-r15 = (n300, n600, n600, n1000)
- nprach-TBSMsg1-TBS2-EDT-r15 = (n300, n600, n1000)
- nprach-TBSMsg1-TBS3-EDT-r15 = (n300, n600, n1000)

CONFIGURATION FOR EACH $TBS_{MSG1}$ IN SET OF [$TBS_{MSG1}$]

- nprach-SubcarrierOffset-EDT-TBS1-r15 = *n0*
- nprach-SubcarrierOffset-EDT-TBS2-r15 = *n12*
- nprach-SubcarrierOffset-EDT-TBS3-r15 = *n24*

CONFIGURATION FOR ALL $TBS_{MSG1}$ SETS

- nprach-SubcarrierMSG3-RangeStart-EDT-r15 = *zero* (no PRACH resources for legacy)
- nprach-NumSubcarriers-EDT-r15 = *n12*
- nprach-NumCBRA-StartSubcarriers-EDT-r15 = *n48*

FIG. 2

| TBS$_{Msg1}$ | [TBS$_{Msg3}$] | | | | | |
|---|---|---|---|---|---|---|
| 300 | 56 | 120 | 176 | 224 | 296 |
| 600 | 328 | 392 | 456 | 504 | 584 |
| 1000 | 616 | 680 | 744 | 808 | 872 |

NB-IOT PRACH RESOURCE PARTITIONING AND MULTIPLE GRANTS IN RAR FOR EDT

CROSS REFERENCE TO RELATED PATENT APPLICATION(S)

The present disclosure is part of a non-provisional application claiming the priority benefit of U.S. Patent Application No. 62/587,671, filed on 17 Nov. 2017, the content of which is incorporated by reference in its entirety.

TECHNICAL FIELD

The present disclosure is generally related to Internet of Things (IoT) and, more particularly, to narrowband IoT (NB-IoT) physical random access channel (PRACH) resource partitioning and multiple grants in random access response (RAR) for early data transmission (EDT).

BACKGROUND

Unless otherwise indicated herein, approaches described in this section are not prior art to the claims listed below and are not admitted as prior art by inclusion in this section.

Figure 8:
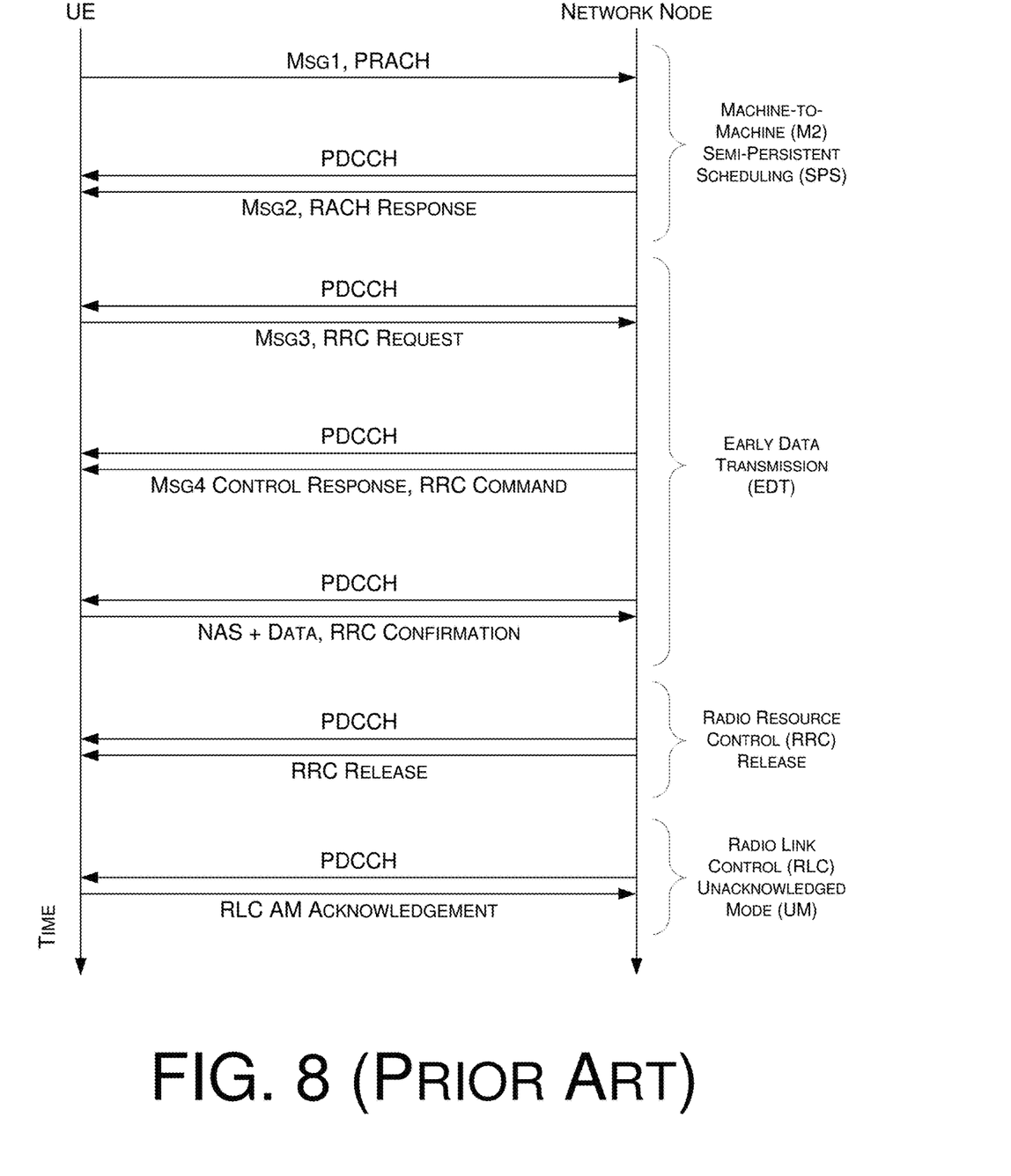
FIG. 8 is a diagram of support for NB-IoT early UL data transmission under current 3GPP specification.

NB-IoT is a low-power wide area network radio technology standard developed by the $3^{rd}$-Generation Partnership Project (3GPP) to enable a wide range of cellular devices, or UEs, and services. Under current 3GPP specification, as shown in FIG. 8, it is feasible to support early uplink (UL) data transmission in message 3 (Msg3) from an NB-IoT user equipment (UE) using some transport block size (TBS) value(s) from the TBS range specified for NB-IoT in Rel-13 of the specification with a maximum total TBS of 1000 bits. The physical layer design would assume that a base station (e.g., eNB or gNB) is not required to always provide a grant of a larger TBS for Msg3 and can decide to provide a grant for a small TBS size (e.g., 88 bits) instead.

For EDT, dedicated NB-IoT PRACH (NPRACH) resource pools are used to ensure backward compatibility. Partitioning of NPRACH resources for legacy and EDT is done in time domain and frequency domain. However, with the agreed maximum TBS of 1000 bits in Msg3 for EDT, average padding is 500 bits (or 50% padding overhead). This is very high overhead and, thus, results in wasted power consumption by the UE.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of the aforementioned issues, the present disclose aims to provide a solution to avoid excessive padding due to limited EDT TBS granularity while keeping EDT NPRACH overhead and configuration simple. Moreover, it is desirable to eliminate, minimize or otherwise reduce wasted power consumption by the UE due to padding.

In one aspect, a method may involve a processor of a network node scheduling a plurality of grants for EDT during a random access (RA) procedure with a user equipment (UE). The method may also involve the processor transmitting to the UE a message indicating the plurality of grants mapped to a maximum broadcast TBS configured for each of one or more preamble resource of a plurality of preamble resources.

In one aspect, a method may involve a processor of a UE calculating a TBS that fits an UL data packet of the UE. The method may also involve the processor selecting one or more PRACH resources for EDT for the TBS based on a wireless communication coverage of the UE by a network node of a wireless network. The method may further involve the processor transmitting to the network node in a RA procedure with the network node a first message (Msg1) indicating the selected one or more PRACH resources.

In one aspect, an apparatus, which may be implemented in a UE, may include a processor. The processor may be capable of performing operations including: (1) calculating a TBS that fits an UL data packet of the UE; (2) selecting one or more PRACH resources for EDT for the TBS based on a wireless communication coverage of the UE by a network node of a wireless network; and (3) transmitting to the network node in a RA procedure with the network node a first message (Msg1) indicating the selected one or more PRACH resources.

It is noteworthy that, although description provided herein may be in the context of certain radio access technologies, networks and network topologies such as IoT and NB-IoT, the proposed concepts, schemes and any variation(s)/derivative(s) thereof may be implemented in, for and by other types of radio access technologies, networks and network topologies such as, for example and without limitation, $5^{th}$ Generation (5G), New Radio (NR), Long-Term Evolution (LTE), LTE-Advanced, LTE-Advanced Pro. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to NB-IoT PRACH resource partitioning and multiple grants in RAR for EDT. According to the present disclosure, a number of possible solutions may be implemented separately or jointly. That is, although these possible solutions may be described below separately, two or more of these possible solutions may be implemented in one combination or another.

Figure 1:
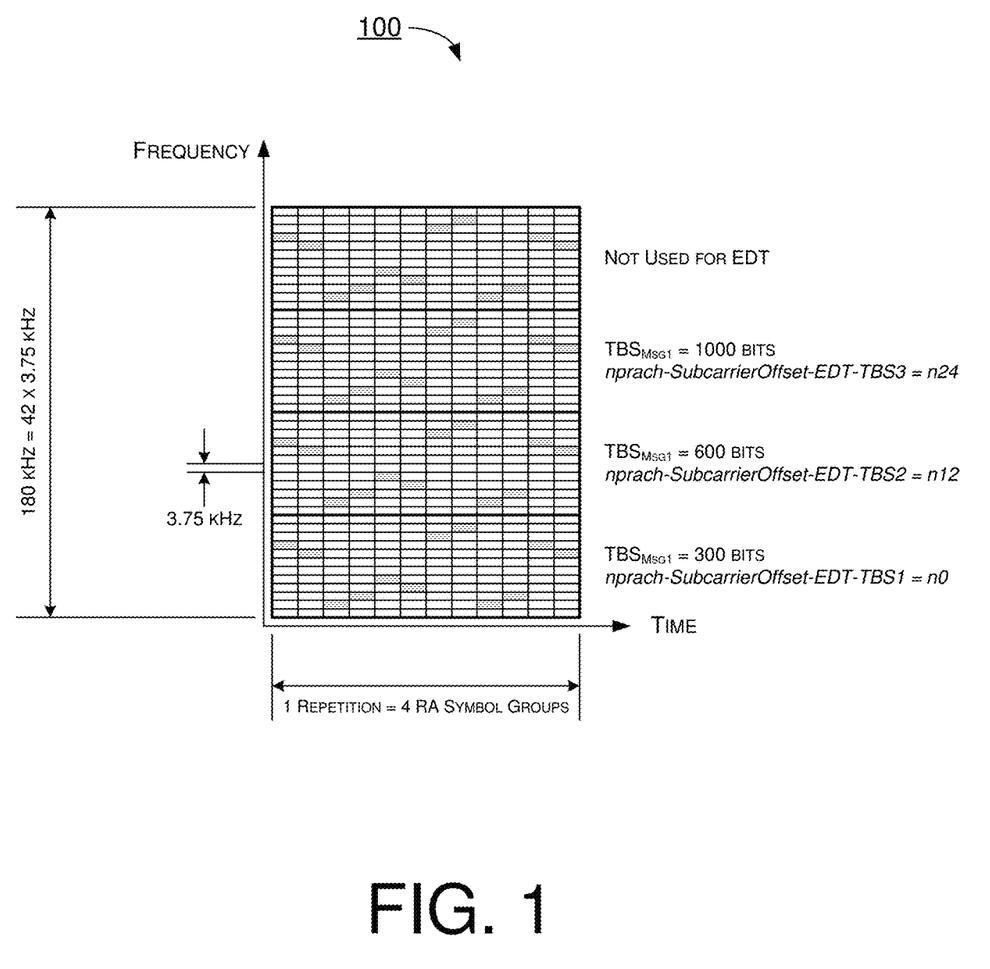
FIG. 1 is a diagram of an example scenario of EDT NPRACH resource partitioning in accordance with an implementation of the present disclosure.

Under a first proposed scheme in accordance with the present disclosure, with respect to partitioning of EDT NPRACH resource pool, TBS may be indicated for coverage enhancement levels 1 and 2 in the frequency domain. For instance, three TBS values may be indicated with a set of multiple $TBS_{Msg1}$ (herein denoted as $[TBS_{Msg1}]$), which may include the sizes of 300 bits, 600 bits and 1000 bits. As an example, with the agreed maximum TBS being 1000 bits in Msg3 for EDT, indication of TBS in message 1 (Msg1) may reduce average padding overhead to about 31.6% (=(150/300+150/600+200/1000)/3). Advantageously, this saves about 18.4% (=50%–31.6%). FIG. 1 illustrates an example scenario 100 of EDT NPRACH resource partitioning in accordance with an implementation of the present disclosure.

Figure 2:
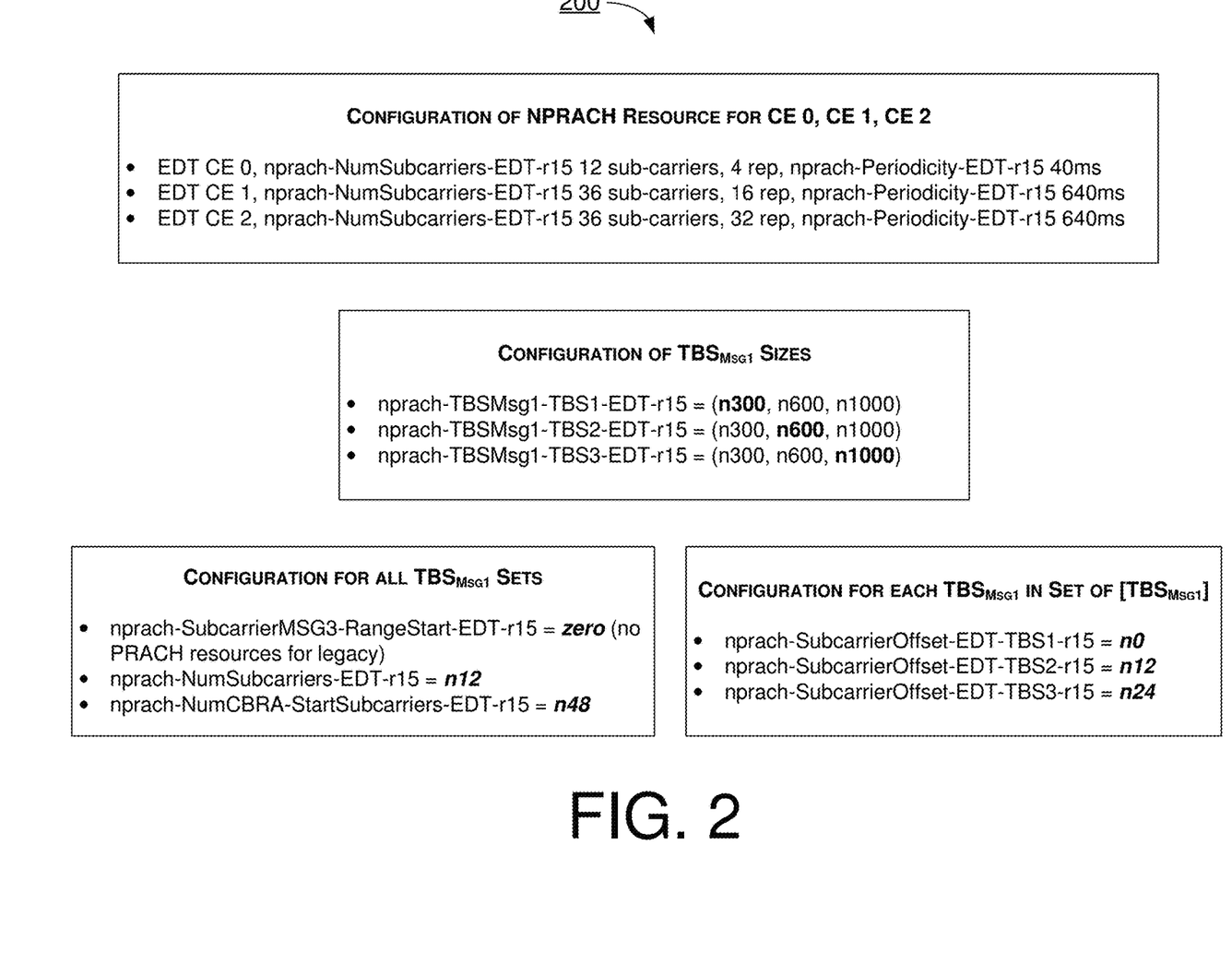
FIG. 2 is a diagram of an example scenario of radio resource control (RRC) configurations in accordance with an implementation of the present disclosure.

Under the first proposed scheme, EDT indication of NPRACH resource pool may be configured by a frequency parameter, nprach-SubcarrierMSG3-RangeStart. Moreover, EDT indication of NPRACH resource sub-pools for control element (CE) 0, CE 1 and CE 2 as well as $[TBS_{Msg1}]$=300 bits, 600 bits and 1000 bits, may be configured by timing parameters, nprach-StartTime and nprach-Periodicity, and a frequency parameter, nprach-SubcarrierOffset. FIG. 2 illustrates an example scenario 200 of RRC configurations in accordance with an implementation of the present disclosure.

Under a second proposed scheme in accordance with the present disclosure, multiple EDT UL grants as a set of multiple $TBS_{Msg3}$ (herein denoted as $[TBS_{Msg3}]$) may be linked or otherwise mapped to EDT NPRACH resource sub-pools as $[TBS_{Msg1}]$ to reduce padding for coverage levels CE 1 and CE 2. With multiple grants in random access response (RAR) padding solution, the average padding may be about 33 bits (=(2*150 bits/5+200 bits/5)/3) or about 6.6% (=(33/300+33/600+33/1000)*100/3). Advantageously, this saves about 43% (=50%–6.6%) compared to EDT without TBS indication in Msg1 and multiple grants for Msg3 in RAR.

Figure 3:
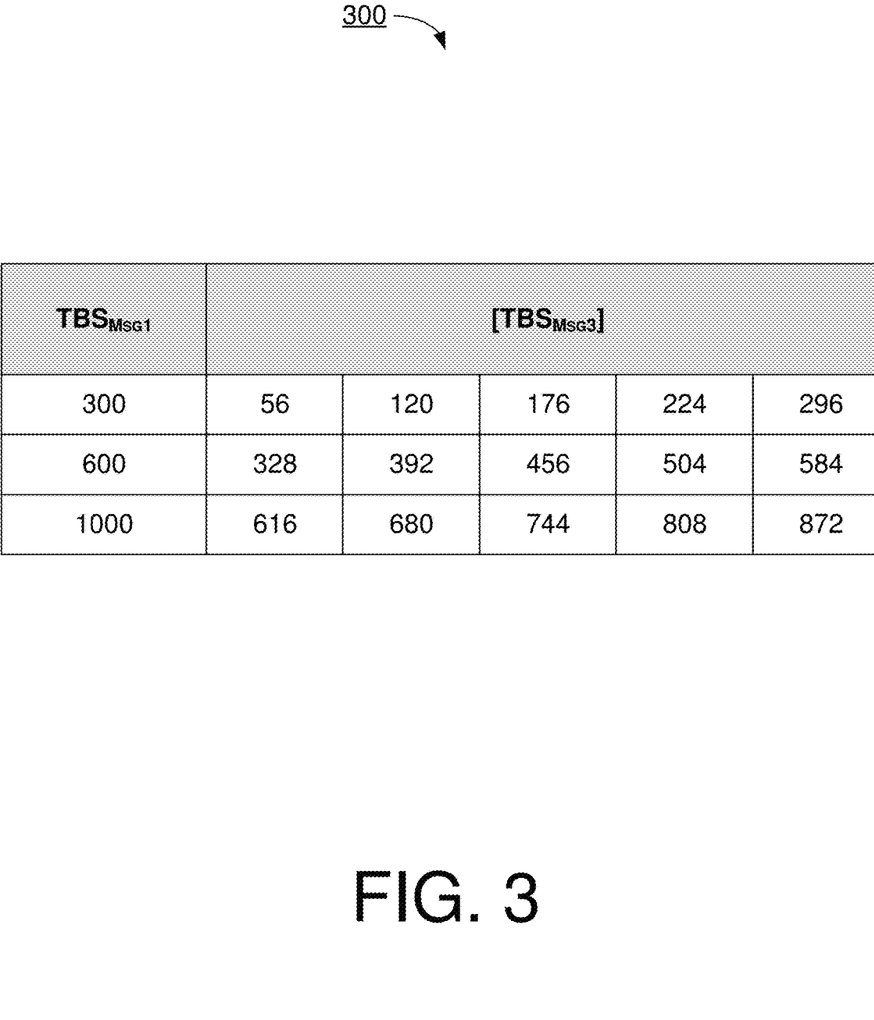
FIG. 3 is a diagram of an example table of mapping between TBS of message 1 and TBS of message 3 in accordance with an implementation of the present disclosure.

As an example, a network node or base station (e.g., eNB or gNB) may use one reserved field for modulation and coding scheme (MCS) index 011, including a number of resource units (RUs) (e.g., number of RU ($N_{RU}$)=8) and multiple EDT UL grants (e.g., $[TBS_{Msg3}]$=56 bits, 120 bits, 176 bits, 224 bits and 296 bits) in message 2 (Msg2) and/or RAR. The number of repetitions ($N_{rep}$)=16 may be indicated via downlink control information (DCI) format N0 in an EDT random access (RA) procedure. FIG. 3 illustrates an example table 300 of mapping between TBS of message 1 and TBS of message 3 in accordance with an implementation of the present disclosure.

Under a third proposed scheme in accordance with the present disclosure, a network node or base station (e.g., eNB or gNB) may provide multiple grants in RAR to indicate scheduled RUs, modulation(s) and TBS values. The UE may choose from a set of possible modulations (e.g., quadrature phase shift keying (QPSK) or 16 quadrature amplitude modulation (16QAM)) and a TBS value in $[TBS_{Msg3}]$ to optimize an effective code rate to optimize reliability of Msg3 transmission in EDT. The effective code rate may be denoted by the expression below in terms of TBS, cyclic redundancy check (CRC) and resource elements (RE), where bits per RE pertains to modulation.

$$\text{Effective Code Rate} = (TBS+CRC)/(RE \times \text{Bits per RE})$$

Under the third proposed scheme, the multiple grants for Msg3 in RAR may be very inefficient due to a limited number of reserved fields, in an event that a fixed modulation and a fixed number of RUs are used. The UE may, at any given time, know its path loss based on measurements of a reference signal received power (RSRP). Moreover, the UE may autonomously optimize the number of RUs and MCS for Msg3 transmission in EDT. The network node or base station may blind detect the modulation and the TBS used by the UE. The set of possible modulation may be either broadcast, indicated via RRC signaling, or hardcoded in the 3GPP specifications.

Figure 4:
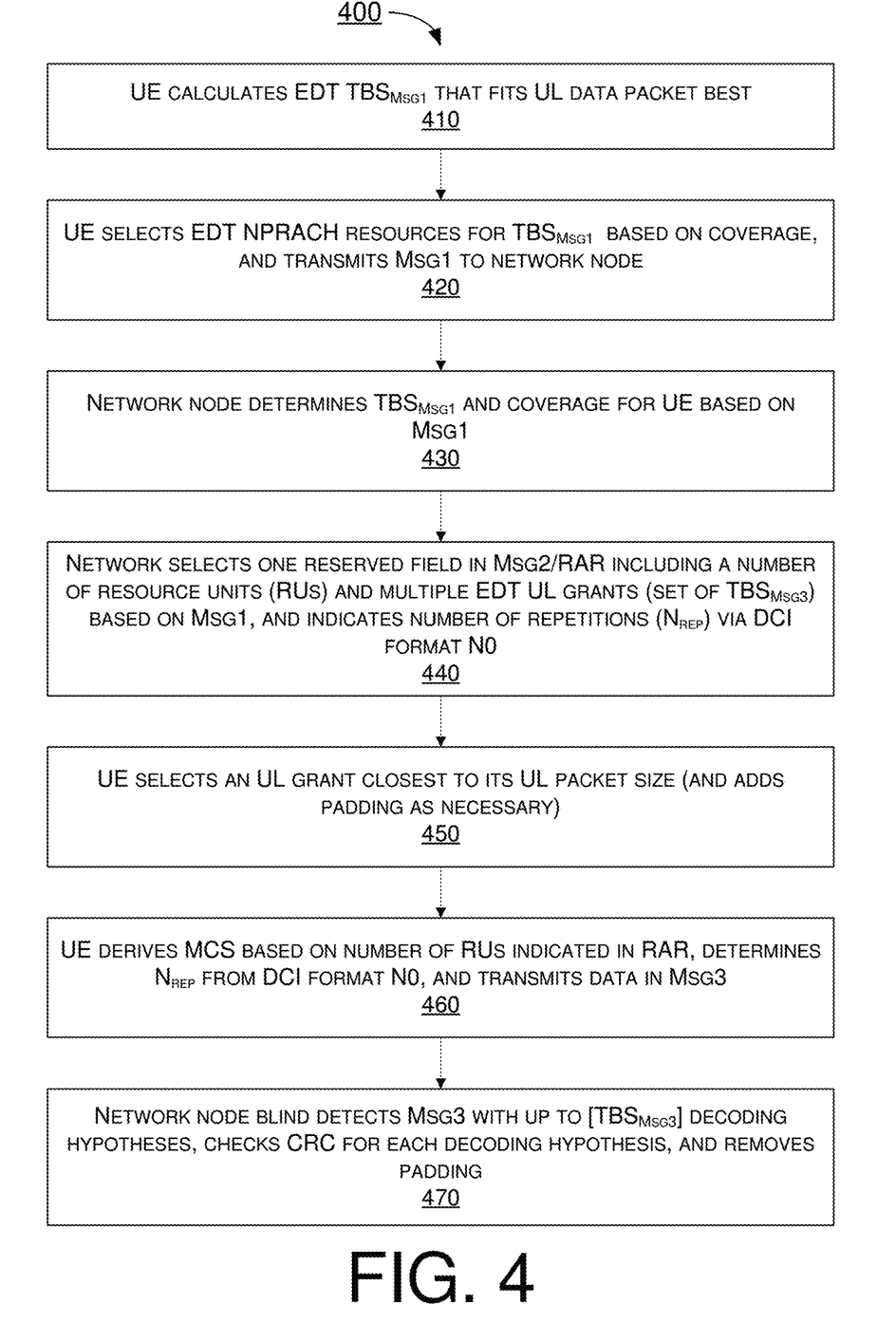
FIG. 4 is a flowchart of an example of EDT random access (RA) procedure with reduced padding in accordance with an implementation of the present disclosure.

FIG. 4 illustrates an example procedure 400 of EDT random access (RA) with reduced padding in accordance with an implementation of the present disclosure. Procedure 400 may include one or more operations, stages, actions, or functions as represented by one or more of blocks 410, 420, 430, 440, 450, 460 and 470. Although illustrated as discrete blocks, various blocks of procedure 400 may be divided into additional blocks, combined into fewer blocks, or eliminated, depending on the desired implementation. Additionally, one or more blocks of procedure 400 may be performed or otherwise executed iteratively. Procedure 400 may be implemented in or by a processor of an electronic apparatus, such as a UE or a network node, as well as processors of electronics apparatuses. Procedure 400 may begin at 410.

At 410, procedure 400 may involve a UE calculating the TBS of message 1 ($TBS_{Msg1}$) for EDT that fits best or most closely the UL data packet of the UE (e.g., 192 bits) in order to reduce padding. Advantageously, this may reduce power consumption by the UE since usage of padding is avoided or otherwise minimized, and the majority of power consumption with respect to the early UL transmission is related to transmission of data. Procedure 400 may proceed from 410 to 420.

At 420, procedure 400 may involve the UE choosing or selecting EDT NPRACH resources for $TBS_{Msg1}$ based on coverage and transmitting Msg1 to a network node (e.g., eNB or gNB). Procedure 400 may proceed from 420 to 430.

At 430, procedure 400 may involve the network node determining the $TBS_{Msg1}$ and coverage of UE based on the received Msg1. For instance, the network node may determine $TBS_{Msg1}$ (e.g., 250 bits) based on the NPRACH resources selected by the UE. The network node may also determine the number of repetitions $N_{rep}$ (e.g., 1, 2, 4, . . . 128) indicated via DCI format N0 based on coverage conditions. However, the network node may not know the packet size (e.g., 192 bits). Procedure 400 may proceed from 430 to 440.

At 440, procedure 400 may involve the network node selecting one reserved field in message 2 (Msg2) or RAR including a number of Rus and multiple EDT UL grants based on Msg1. Procedure 400 may also involve the network node indicating $N_{rep}$ via DCI format N0. For instance, the network node may use one reserved field for MCS index 011 including a number of RUs (e.g., $N_{RU}$=8) and multiple EDT UL grants (e.g., as [$TBS_{Msg3}$] including the sizes of 56 bits, 120 bits, 176 bits, 224 bits and 296 bits) in Msg2/RAR. The network node may also indicate $N_{rep}$=16 via DCI format N0. Procedure 400 may proceed from 440 to 450.

At 450, procedure 400 may involve the UE selecting, among the multiple EDT UL grants, one UL grant that is closest to the UL packet size of the UE. The UE may add padding if and when necessary. For instance, the UE may select a UL grant closest to its UL packet size (e.g., 224 bits) and add padding as needed (e.g., 192 bits of data and 32 bits of padding). Procedure 400 may proceed from 450 to 460.

At 460, procedure 400 may involve the UE deriving MCS based on the number of RUs (e.g., $N_{RU}$=8) indicated in RAR, determining $N_{rep}$ from DCI format N0, and transmitting data in Msg3. Procedure 400 may proceed from 460 to 470.

At 470, procedure 400 may involve the network node blind detecting Msg3 with up to $TBS_{Msg3}$ decoding hypotheses, checking CRC for each decoding hypothesis, and removing padding. For instance, the network node may blind detect Msg3 with up to five $TBS_{Msg3}$ decoding hypotheses for a given $TBS_{Msg1}$, based on UE selection of EDT NPRACH resources. The network node may check CRC for each decoding hypothesis and remove padding.

In view of the above, it would be appreciated by those with ordinary skill in the art that a number of benefits are provided by the various proposed schemes in accordance with the present disclosure. For instance, EDT NPRACH resource sub-pools for coverage levels CE1 and CE 2 may be further fragmented with non-overlapping resources to indicate [$TBS_{Msg1}$] in the frequency domain to reduce padding, thereby reducing power consumption in the UE. Additionally, multiple EDT UL grants as [$TBS_{Msg3}$] in Msg2/RAR may be linked or otherwise mapped to EDT NPRACH resource sub-pools as [$TBS_{Msg1}$] to further reduce padding for coverage levels CE 1 and CE 2 when most needed, due to large number of repetitions. Moreover, the UE may be provided with the flexibility to choose from a set of possible modulations (e.g., QPSK or 16QAM). Furthermore, a TBS value in [$TBS_{Msg3}$] may be indicated in the multiple grants in EDT RAR to optimize the effective code rate which the network node needs to detect.

Illustrative Implementations

Figure 5:
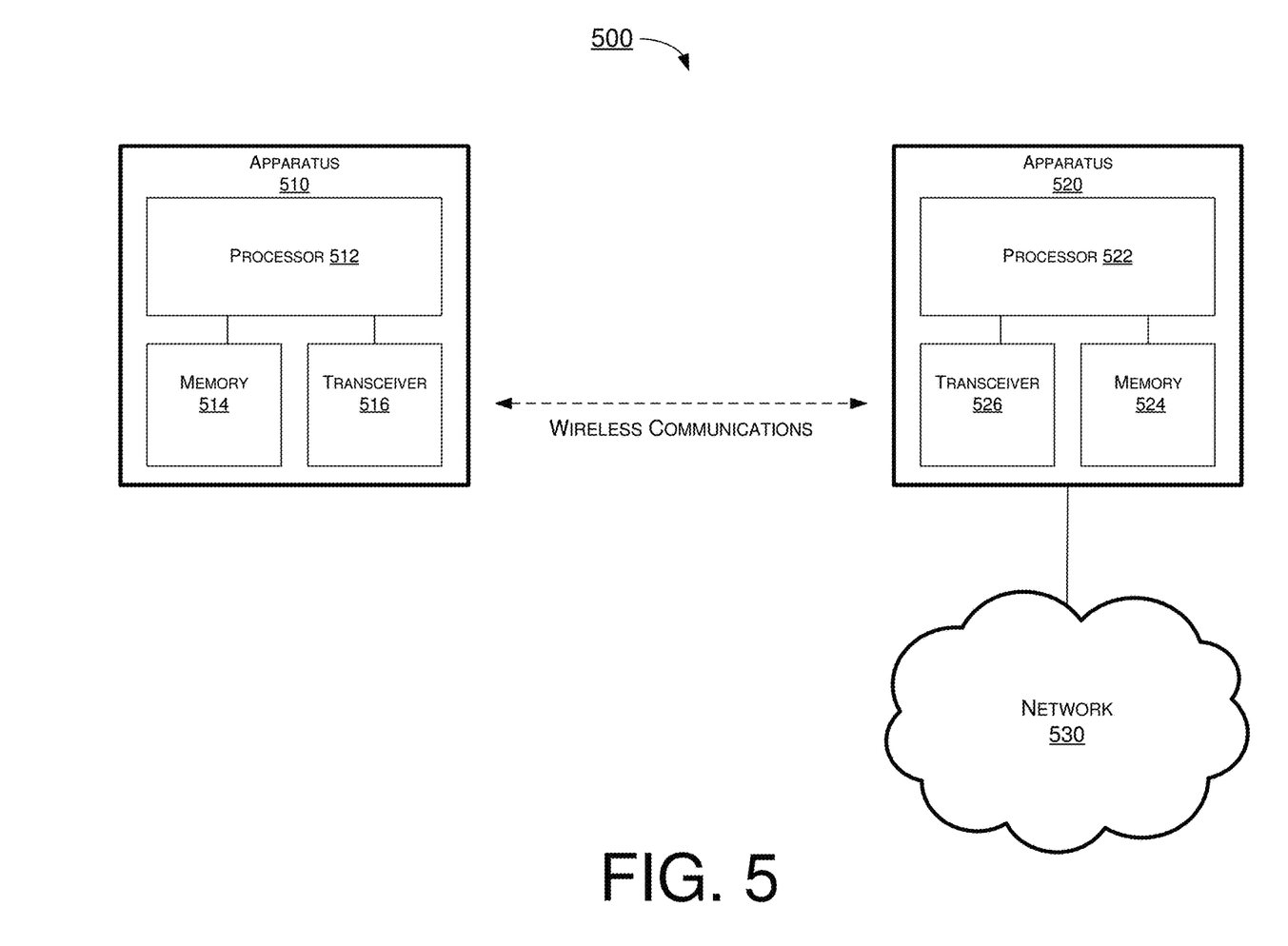
FIG. 5 is a block diagram of an example communication environment in accordance with an implementation of the present disclosure.

FIG. 5 illustrates an example communication environment 500 having an example apparatus 510 and an example apparatus 520 in accordance with an implementation of the present disclosure. Each of apparatus 510 and apparatus 520 may perform various functions to implement schemes, techniques, processes and methods described herein pertaining to NB-IoT PRACH resource partitioning and multiple grants in RAR for EDT, including various schemes and procedure 400 described above as well as processes 600 and 700 described below.

Each of apparatus 510 and apparatus 520 may be a part of an electronic apparatus, which may be a user equipment (UE) such as a portable or mobile apparatus, a wearable apparatus, a wireless communication apparatus or a computing apparatus. For instance, each of apparatus 510 and apparatus 520 may be implemented in a smartphone, a smartwatch, a personal digital assistant, a digital camera, or a computing equipment such as a tablet computer, a laptop computer or a notebook computer. Each of apparatus 510 and apparatus 520 may also be a part of a machine type apparatus, which may be an IoT or NB-IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. Alternatively, each of apparatus 510 and apparatus 520 may be implemented in the form of one or more integrated-circuit (IC) chips such as, for example and without limitation, one or more single-core processors, one or more multi-core processors, or one or more complex-instruction-set-computing (CISC) processors. Each of apparatus 510 and apparatus 520 may include at least some of those components shown in FIG. 5 such as a processor 512 and a processor 522, respectively. Each of apparatus 510 and apparatus 520 may further include one or more other components not pertinent to the proposed scheme of the present disclosure (e.g., internal power supply, display device and/or user interface device), and, thus, such component(s) of each of apparatus 510 and apparatus 520 are neither shown in FIG. 5 nor described below in the interest of simplicity and brevity.

In some implementations, at least one of apparatus 510 and apparatus 520 may be a part of an electronic apparatus, which may be a network node or base station (e.g., eNB, gNB or transmit/receive point (TRP)), a small cell, a router or a gateway. For instance, at least one of apparatus 510 and apparatus 520 may be implemented in an eNodeB in an LTE, LTE-Advanced or LTE-Advanced Pro network or in a gNB in a 5G, NR, IoT or NB-IoT network. Alternatively, at least one of apparatus 510 and apparatus 520 may be implemented in the form of one or more IC chips such as, for example and without limitation, one or more single-core processors, one or more multi-core processors, or one or more CISC processors.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including NB-IoT PRACH resource partitioning and multiple grants in RAR for EDT in accordance with various implementations of the present disclosure.

In some implementations, apparatus 510 may also include a transceiver 516 coupled to processor 512 and capable of wirelessly transmitting and receiving data. In some implementations, apparatus 510 may further include a memory 514 coupled to processor 512 and capable of being accessed by processor 512 and storing data therein. In some implementations, apparatus 520 may also include a transceiver 526 coupled to processor 522 and capable of wirelessly transmitting and receiving data. In some implementations, apparatus 520 may further include a memory 524 coupled to processor 522 and capable of being accessed by processor 522 and storing data therein. Accordingly, apparatus 510 and apparatus 520 may wirelessly communicate with each other via transceiver 516 and transceiver 526, respectively.

To aid better understanding, the following description of the operations, functionalities and capabilities of each of apparatus 510 and apparatus 520 is provided in the context of a mobile communication environment in which apparatus 510 is implemented in or as a wireless communication device, a communication apparatus or a UE and apparatus 520 is implemented in or as a network node (e.g., base station) connected or otherwise communicatively coupled to a wireless network 530 (e.g., a 5G/NR network).

In one aspect, processor 522 of apparatus 520 as a network node may schedule a plurality of grants for EDT during a RA procedure with apparatus 510 as a UE. Additionally, processor 522 may transmit, via transceiver 526, to apparatus 510 a message indicating the plurality of grants mapped to a maximum broadcast TBS configured for each of one or more preamble resource of a plurality of preamble resources.

In some implementations, the plurality of grants may indicate a plurality of modulations, a plurality of RUs and a plurality of data packet sizes for apparatus 510 to choose from to optimize an effective code rate of apparatus 510.

In some implementations, in transmitting the indication, processor 522 may perform one of the following: broadcasting the indication periodically, transmitting the indication via dedicated signaling, or transmitting the indication dynamically.

In some implementations, processor 522 may also select the one or more preamble resources from the plurality of preamble resources. Moreover, processor 522 may map the plurality of grants to the selected preamble resource.

In some implementations, processor 522 may also receive, via transceiver 526, a message from apparatus 510. Furthermore, processor 522 may determine one or more data packet sizes selected by apparatus 510 based on the message.

In some implementations, processor 522 may also partition the plurality of preamble resources. The message may further indicate the maximum broadcast TBS that enhances wireless communication coverage of apparatus 510 by the network node in a frequency domain.

In some implementations, processor 522 may also receive, via transceiver 526, from apparatus 510 a preamble transmission on the one or more preamble resources. Moreover, processor 522 may select the plurality of grants responsive to receiving the preamble transmission.

In another aspect, processor 512 of apparatus 510 as a UE may calculate a TBS that fits an UE data packet of apparatus 510. Additionally, processor 512 may select one or more PRACH resources for EDT for the TBS based on a wireless communication coverage of apparatus 510 by apparatus 520 as a network node of a wireless network. Moreover, processor 522 may transmit, via transceiver 516, to apparatus 520 in a RA procedure with apparatus 520 a first message (Msg1) indicating the selected one or more PRACH resources.

In some implementations, processor 512 may also receive, via transceiver 516, from apparatus 520 a second message (Msg2) of the RA procedure. In some implementations, the second message may indicate a plurality of grants for EDT during the RA procedure.

In some implementations, the plurality of grants may indicate a plurality of modulations, a plurality of RUs and a plurality of data packet sizes for apparatus 510 to choose from to optimize an effective code rate of apparatus 510.

In some implementations, processor 512 may also derive a MCS based on the number of RUs indicated in the second message.

In some implementations, processor 512 may also receive, via transceiver 516, from apparatus 520 an indication of a number of repetitions via DCI format N0.

In some implementations, processor 512 may select one of the plurality of grants that is closer to a packet size of the UL data packet than other grants of the plurality of grants. Moreover, processor 512 also add padding to the UL data packet. Furthermore, processor 512 may transmit, via transceiver 516, to apparatus 520 a third message (Msg3) of the RA procedure including the UL data packet.

In yet another aspect, processor 512 of apparatus 510 as a UE may calculate the TBS of message 1 ($TBS_{Msg1}$) for EDT that fits best or most closely the UL data packet of the UE (e.g., 192 bits) in order to reduce padding. Processor 512 may select EDT NPRACH resources for $TBS_{Msg1}$ based on coverage and transmitting Msg1 to apparatus 520 as a network node. Processor 522 of apparatus 520 may determine the $TBS_{Msg1}$ and coverage of apparatus 510 based on the received Msg1. Processor 522 may also select one reserved field in message 2 (Msg2) or RAR including a number of Rus and multiple EDT UL grants based on Msg1. Processor 522 may further indicate $N_{rep}$ via DCI format N0. Processor 512 may select, among the multiple EDT UL grants, one UL grant that is closest to the UL packet size of apparatus 510. Processor 512 may add padding if and when necessary. Processor 512 may derive MCS based on the number of RUs (e.g., $N_{RU}$=8) indicated in RAR, determine $N_{rep}$ from DCI format N0, and transmit data in Msg3. Procedure 400 may proceed from 460 to 470. Processor 522 may blind detect Msg3 with up to $TBS_{Msg3}$ decoding hypotheses, check CRC for each decoding hypothesis, and remove the padding.

Illustrative Processes

Figure 6:
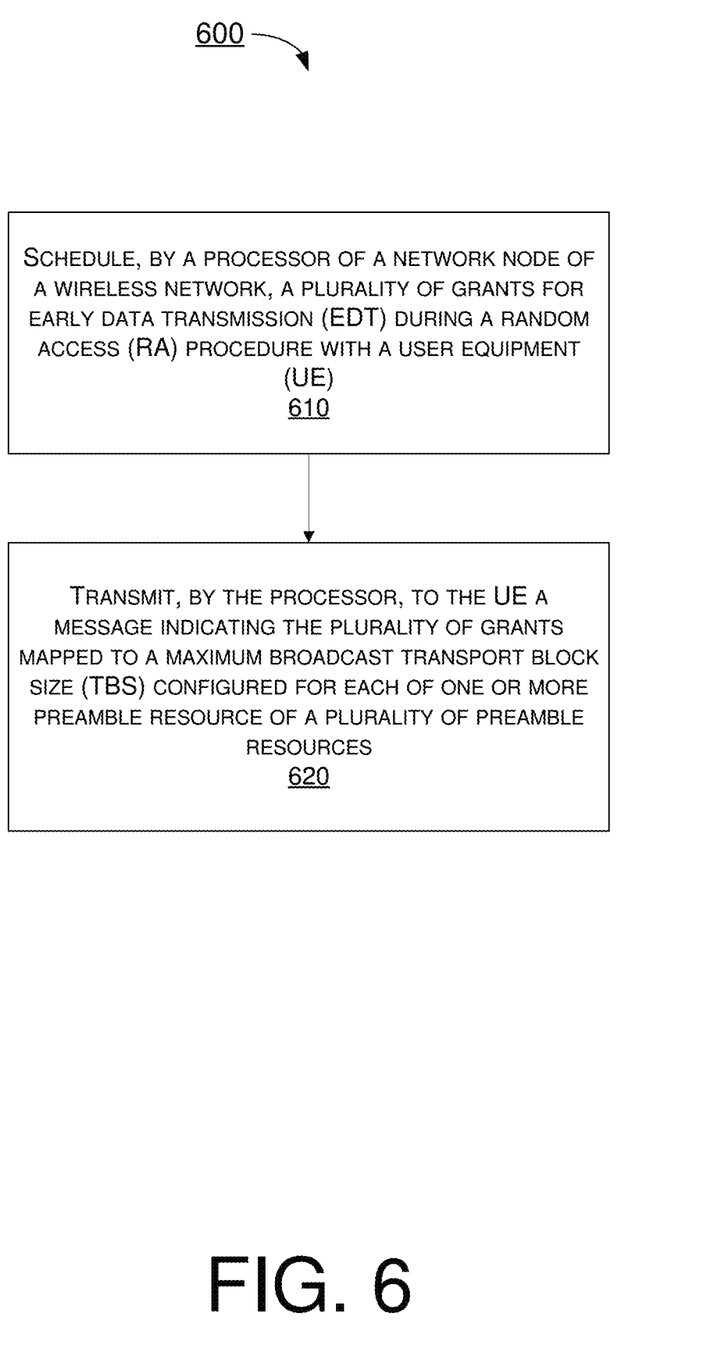
FIG. 6 is a flowchart of an example process in accordance with an implementation of the present disclosure.

FIG. 6 illustrates an example process 600 in accordance with an implementation of the present disclosure. Process 600 may be an example implementation of the proposed schemes described above with respect to NB-IoT PRACH resource partitioning and multiple grants in RAR for EDT in accordance with the present disclosure. Process 600 may represent an aspect of implementation of features of apparatus 510 and apparatus 520. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order.

Process 600 may also be repeated partially or entirely. Process 600 may be implemented by apparatus 510, apparatus 520 and/or any suitable wireless communication device, UE, base station or machine type devices. Solely for illustrative purposes and without limitation, process 600 is described below in the context of apparatus 510 as a UE and apparatus 520 as a network node (e.g., base station) of wireless network 530. Process 600 may begin at block 610.

At 610, process 600 may involve processor 522 of apparatus 520 as a network node scheduling a plurality of grants for EDT during a RA procedure with apparatus 510 as a UE. Process 600 may proceed from 610 to 620.

At 620, process 600 may involve processor 522 transmitting, via transceiver 526, to apparatus 510 a message indicating the plurality of grants mapped to a maximum broadcast transport block size (TBS) configured for each of one or more preamble resource of a plurality of preamble resources.

In some implementations, the plurality of grants may indicate a plurality of modulations, a plurality of RUs and a plurality of data packet sizes for apparatus 510 to choose from to optimize an effective code rate of apparatus 510. For instance, the effective code rate of apparatus 510 may be expressed as: effective code rate=(TBS+CRC)/(RE×bits per RE). Here, the bits per RE may pertain to modulation.

In some implementations, in transmitting the indication, process 600 may involve processor 522 broadcasting the indication periodically, transmitting the indication via dedicated signaling, or transmitting the indication dynamically.

In some implementations, process 600 may involve processor 522 performing additional operations. For instance, process 600 may involve processor 522 selecting the one or more preamble resources from the plurality of preamble resources. Moreover, process 600 may involve processor 522 mapping the plurality of grants to the selected preamble resource.

In some implementations, process 600 may involve processor 522 performing additional operations. For instance, process 600 may involve processor 522 receiving, via transceiver 526, a message from apparatus 510. Furthermore, process 600 may involve processor 522 determining one or more data packet sizes selected by apparatus 510 based on the message.

In some implementations, process 600 may involve processor 522 performing additional operations. For instance, process 600 may involve processor 522 partitioning the plurality of preamble resources. The message may further indicate the maximum broadcast TBS that enhances wireless communication coverage of apparatus 510 by the network node in a frequency domain.

In some implementations, process 600 may involve processor 522 performing additional operations. For instance, process 600 may involve processor 522 receiving, via transceiver 526, from apparatus 510 a preamble transmission on the one or more preamble resources. Moreover, process 600 may involve processor 522 selecting the plurality of grants responsive to receiving the preamble transmission.

Figure 7:
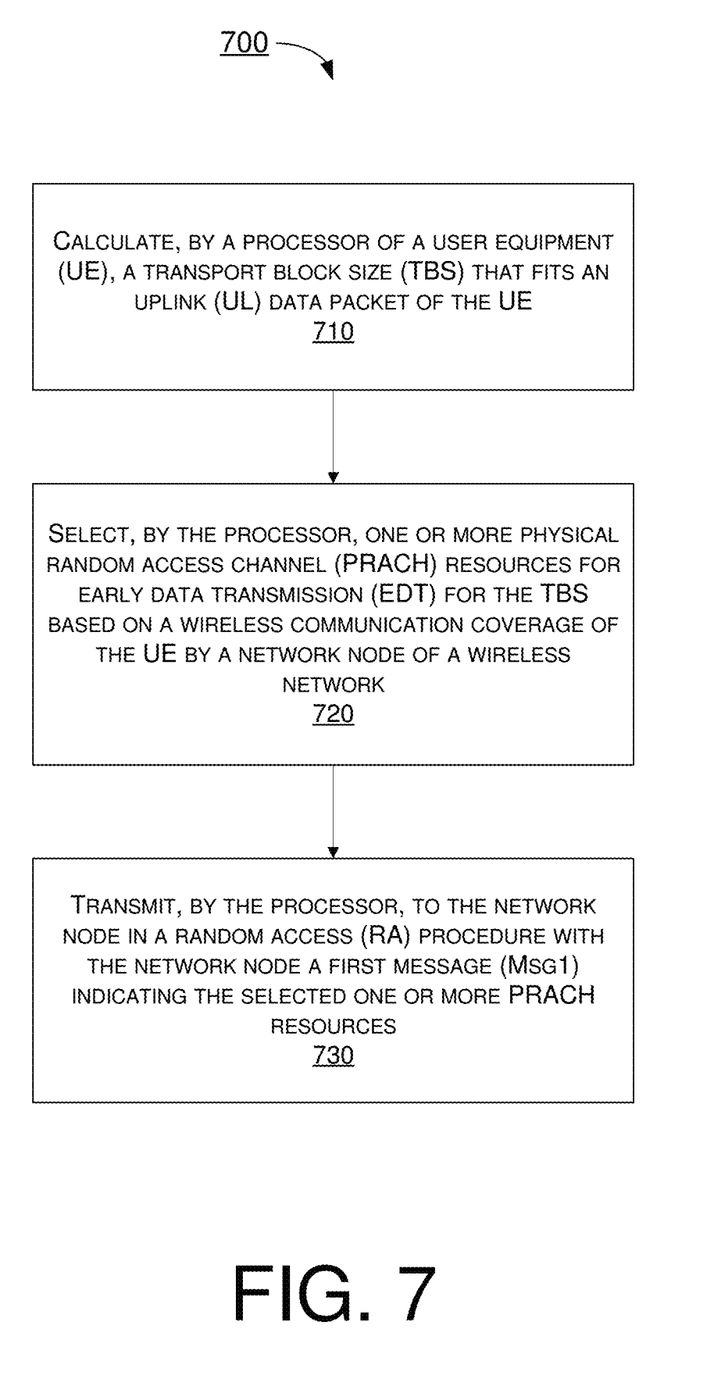
FIG. 7 is a flowchart of an example process in accordance with an implementation of the present disclosure.

FIG. 7 illustrates an example process 700 in accordance with an implementation of the present disclosure. Process 700 may be an example implementation of the proposed schemes described above with respect to NB-IoT PRACH resource partitioning and multiple grants in RAR for EDT in accordance with the present disclosure. Process 700 may represent an aspect of implementation of features of apparatus 510 and apparatus 520. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may also be repeated partially or entirely. Process 700 may be implemented by apparatus 510, apparatus 520 and/or any suitable wireless communication device, UE, base station or machine type devices. Solely for illustrative purposes and without limitation, process 700 is described below in the context of apparatus 510 as a UE and apparatus 520 as a network node (e.g., base station) of wireless network 530. Process 700 may begin at block 710.

At 710, process 700 may involve processor 512 of apparatus 510 as a UE calculating a TBS that fits an UE data packet of apparatus 510. Process 700 may proceed from 710 to 720.

At 720, process 700 may involve processor 512 selecting one or more PRACH resources for EDT for the TBS based on a wireless communication coverage of apparatus 510 by apparatus 520 as a network node of a wireless network. Process 700 may proceed from 720 to 730.

At 730, process 700 may involve processor 522 transmitting, via transceiver 516, to apparatus 520 in a random access (RA) procedure with apparatus 520 a first message (Msg1) indicating the selected one or more PRACH resources.

In some implementations, process 700 may involve processor 512 performing additional operations. For instance, process 700 may involve processor 512 receiving, via transceiver 516, from apparatus 520 a second message (Msg2) of the RA procedure. In some implementations, the second message may indicate a plurality of grants for EDT during the RA procedure.

In some implementations, the plurality of grants may indicate a plurality of modulations, a plurality of RUs and a plurality of data packet sizes for apparatus 510 to choose from to optimize an effective code rate of apparatus 510.

In some implementations, process 700 may involve processor 512 performing additional operations. For instance, process 700 may involve processor 512 deriving a MCS based on the number of RUs indicated in the second message.

In some implementations, process 700 may involve processor 512 performing additional operations. For instance, process 700 may involve processor 512 receiving, via transceiver 516, from apparatus 520 an indication of a number of repetitions via DCI format N0.

In some implementations, process 700 may involve processor 512 performing additional operations. For instance, process 700 may involve processor 512 selecting one of the plurality of grants that is closer to a packet size of the UL data packet than other grants of the plurality of grants. Moreover, process 700 may involve processor 512 adding padding to the UL data packet. Furthermore, process 700 may involve processor 512 transmitting, via transceiver 516, to apparatus 520 a third message (Msg3) of the RA procedure including the UL data packet.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   scheduling, by a processor of a network node of a wireless network, a plurality of grants for early data transmission (EDT) during a random access (RA) procedure with a user equipment (UE); and
   transmitting, by the processor, to the UE a message indicating the plurality of grants mapped to a plurality of maximum broadcast transport block sizes (TBSs) configured for one or more preamble resource of a plurality of preamble resources,
   wherein the plurality of grants indicate a plurality of modulations, a plurality of resource units (RUs) and a plurality of data packet sizes for the UE to choose from to optimize an effective code rate of the UE,
   wherein the effective code rate of the UE is expressed in terms of TBS, cyclic redundancy check (CRC) and resource elements (RE) as:

effective code rate=(TBS+CRC)/(RE×bits per RE),
   and wherein the bits per RE pertain to modulation.

2. The method of claim 1, wherein the transmitting of the indication comprises broadcasting the indication periodically, transmitting the indication via dedicated signaling, or transmitting the indication dynamically.

3. The method of claim 1, further comprising:
   selecting, by the processor, the one or more preamble resources from the plurality of preamble resources; and
   mapping, by the processor, the plurality of grants to the selected preamble resource.

4. The method of claim 1, further comprising:
   receiving, by the processor, a message from the UE; and
   determining, by the processor, one or more data packet sizes selected by the UE based on the message.

5. The method of claim 1, further comprising:
   partitioning, by the processor, the plurality of preamble resources,
   wherein the message further indicates the maximum broadcast TBS that enhances wireless communication coverage of the UE by the network node in a frequency domain.

6. The method of claim 1, further comprising:
   receiving, by the processor, from the UE a preamble transmission on the one or more preamble resources; and
   selecting, by the processor, the plurality of grants responsive to receiving the preamble transmission.

7. A method, comprising:
   calculating, by a processor of a user equipment (UE), a transport block size (TBS) of a third message (Msg3) related to a first message (Msg1) in a random access (RA) procedure that fits an uplink (UL) data packet of the UE;

selecting, by the processor, one or more physical random access channel (PRACH) resources for early data transmission (EDT) for the TBS based on a wireless communication coverage of the UE by a network node of a wireless network; and transmitting, by the processor, to the network node in the RA procedure with the network node the Msg1 indicating the selected one or more PRACH resources, wherein an effective code rate of the UE is expressed in terms of TBS, cyclic redundancy check (CRC) and resource elements (RE) as:

effective code rate=(TBS+CRC)/(RE×bits per RE), wherein the bits per RE pertain to modulation.

8. The method of claim 7, further comprising:
receiving, by the processor, from the network node a second message (Msg2) of the RA procedure,
wherein the second message indicates a plurality of grants for EDT during the RA procedure.

9. The method of claim 8, wherein the plurality of grants indicate a plurality of modulations, a plurality of resource units (RUs) and a plurality of data packet sizes for the UE to choose from to optimize the effective code rate of the UE.

10. The method of claim 9, further comprising:
deriving, by the processor, a modulation and coding scheme (MCS) based on the number of RUs indicated in the second message.

11. The method of claim 8, further comprising:
receiving, by the processor, from the network node an indication of a number of repetitions via downlink control information (DCI) format N0.

12. The method of claim 8, further comprising:
selecting, by the processor, one of the plurality of grants that is closer to a packet size of the UL data packet than other grants of the plurality of grants;
adding, by the processor, padding to the UL data packet; and
transmitting, by the processor, to the network node a third message (Msg3) of the RA procedure including the UL data packet.

13. An apparatus implementable in a user equipment (UE), comprising:
a processor configured to perform operations comprising:
calculating a transport block size (TBS) of a third message (Msg3) related to a first message (Msg1) in a random access (RA) procedure that fits an uplink (UL) data packet of the UE;
selecting one or more physical random access channel (PRACH) resources for early data transmission (EDT) for the TBS based on a wireless communication coverage of the UE by a network node of a wireless network; and
transmitting to the network node in the RA procedure with the network node the Msg1 indicating the selected one or more PRACH resources,
wherein an effective code rate of the UE is expressed in terms of TBS, cyclic redundancy check (CRC) and resource elements (RE) as:

effective code rate=(TBS+CRC)/(RE×bits per RE), wherein the bits per RE pertain to modulation.

14. The apparatus of claim 13, wherein the processor is further capable of:
receiving, by the processor, from the network node a second message (Msg2) of the RA procedure,
wherein the second message indicates a plurality of grants for EDT during the RA procedure.

15. The apparatus of claim 14, wherein the plurality of grants indicate a plurality of modulations, a plurality of resource units (RUs) and a plurality of data packet sizes for the UE to choose from to optimize the effective code rate of the UE.

16. The apparatus of claim 15, wherein the processor is further configured to perform operations comprising:
deriving, by the processor, a modulation and coding scheme (MCS) based on the number of RUs indicated in the second message.

17. The apparatus of claim 14, wherein the processor is further configured to perform operations comprising:
receiving, by the processor, from the network node an indication of a number of repetitions via downlink control information (DCI) format N0.

18. The apparatus of claim 14, wherein the processor is further configured to perform operations comprising:
selecting, by the processor, one of the plurality of grants that is closer to a packet size of the UL data packet than other grants of the plurality of grants;
adding, by the processor, padding to the UL data packet; and
transmitting, by the processor, to the network node a third message (Msg3) of the RA procedure including the UL data packet.

* * * * *